United States Patent [19]

Koshiga et al.

[11] 4,034,179

[45] July 5, 1977

[54] METHOD OF MULTIPLE ELECTRODE GAS SHIELDED ARC WELDING

[75] Inventors: Fusao Koshiga, Kawasaki; Jinkichi Tanaka; Itaru Watanabe, both of Yokohama, all of Japan

[73] Assignee: Nippon Kokan Kabushiki Kaisha, Tokyo, Japan

[22] Filed: Nov. 17, 1975

[21] Appl. No.: 633,020

[30] Foreign Application Priority Data

Nov. 26, 1974 Japan .......................... 49-135181

[52] U.S. Cl. .............................. 219/74; 219/137 R
[51] Int. Cl.$^2$ ............................................ B23K 9/16
[58] Field of Search ............ 219/137 R, 73, 74, 130

[56] References Cited

UNITED STATES PATENTS

| | | |
|---|---|---|
| 2,756,311 | 7/1956 | Persson et al. ..................... 219/74 X |
| 2,868,954 | 1/1959 | Skinner et al. ............. 219/137 R X |
| 3,007,033 | 10/1961 | Newman et al. ................. 219/137 R |
| 3,278,720 | 10/1966 | Dixon ............................... 219/74 X |
| 3,309,491 | 3/1967 | Jacobs ....................... 219/137 R X |
| 3,596,051 | 7/1971 | Nomura .......................... 219/137 R |
| 3,644,697 | 2/1972 | Krahl .................................... 219/74 |
| 3,704,358 | 11/1972 | Saito et al. .......................... 219/73 |

Primary Examiner—J. V. Truhe
Assistant Examiner—Fred E. Bell

[57] ABSTRACT

In a multiple electrode gas shielded arc welding method wherein a plurality of electrodes are arranged along the welding seam line of a piece of metal to be welded and the continuous gas shielded arc welding of the piece is accomplished simultaneously by the electrodes, the chemical composition of a mixed shielding gas fed to the electrodes is selected in such a manner that the chemical composition of the shielding gas fed to the leading electrode or electrode group differs relative to that fed to the trailing electrode or electrode group to have a different active gas volume ratio and in this way the chemical composition of the weld metal layers formed by the preceeding and following welding operations are homogenizing to ensure uniformity of the properties at every positions in the weld zone.

9 Claims, 10 Drawing Figures

METHOD OF MULTIPLE ELECTRODE GAS SHIELDED ARC WELDING

BACKGROUND OF THE INVENTION

The present invention relates to improvements in the automatic arc welding processes and more particularly to a method of multiple electrode gas shielded arc welding.

The submerged arc welding process and the gas shielded arc welding process are the popular welding processes among the known automatic arc welding processes. A disadvantage of the submerged arc welding process in which a flux is used to serve the purposes of deoxidization and addition of alloying elements is that the removal of the flux is troublesome, the flux is expensive and the equipment tends to become bulky and expensive since it requires additional devices such as a flux feeding device. In the latter gas shielded arc welding process, the work is arc welded by using a pure gas such as argon or carbon dioxide gas or a mixed gas such as a mixture of argon with carbon dioxide gas or oxygen to exclude the entry of the air, particularly oxygen and nitrogen and therefore this welding process has the disadvantage of slow welding speed though it is free from the above-mentioned deficiencies of the submerged arc welding process. In view of these circumstances, the welding processes have been used frequently in which two or more electrodes are arranged in a straight row along the welding seam line of a piece or pieces to be welded for continuously accomplishing the desired multi-layer welding with the multiple electrodes. While this type of process has the effect of improving the welding efficiency to some extent, there is a serious disadvantage tht there is non-uniformity of the properties among the different positions of the weld metal, particularly the impact properties at these positions differ considerably from one another.

SUMMARY OF THE INVENTION

With a view to overcoming the foregoing difficulty, it is an object of the present invention to provide a method of multiple electrode gas shielded arc welding wherein the composition of a shielding gas is controlled in such a manner that there is a relative difference between the preceeding pass and the following pass in the volume ratio of the active gas contained in the shielding gas which is projected around the arc from the electrode wire and in this way the deoxidation reaction during each pass is controlled.

It is another object of the present invention to provide a method of multiple electrode gas shielded arc welding wherein the volume ratio of the active gas in the shielding gas is varied for the respective passes relative to one another to control the deoxidation reaction and thereby homogenizing the chemical composition of the weld metal of the bead layers formed by the respective passes.

It is still another object of the present invention to provide a method of multiple electrode gas shielded arc welding wherein the chemical composition of the weld metal of the bead layers formed by the respective passes is homogenized to ensure an improved welding efficiency and homogenized properties for the weld metal at the respective bead layer positions. In accordance with the present invention, there is thus provided a method of multiple electrode gas shielded arc welding wherein the chemical composition of the shielding gas for the preceeding pass is different from that of the shielding gas for the following pass in such a manner that there is a relative difference in the volume ratio of the active gas in the shielding gas between the preceeding pass and the following pass. More specifically, where the electrode wires used have a chemical composition which is equivalent to that of the base metal or low in alloy contents relative to that of the base metal, the chemical composition of the shielding gas is controlled in such a manner that the volume ratio of the active gas in the shielding gas for the leading electrode or electrode group is higher than that in the shielding gas for the trailing electrode or electrode group, whereas where the electrode wires used have a chemical composition containing alloying elements in greater amounts than the base metal, the chemical composition of the shielding gas is controlled in such a manner that the volume ratio of the active gas in the shielding gas for the leading electrode or electrode group becomes lower than that in the shielding gas for the trailing electrode or electrode group and in this way the weld metal is deposited in a plurality of layers.

These and further objects, features and advantages of the invention will become more apparent when read the following detailed description of the invention by reference to the accompanying drawings.

DETAILED DESCRIPTION OF THE INVENTION

The inventors, etc. have carefully examined the causes of the non-uniformity in the properties of the respective layers in the weld metal which would arise as mentioned above when the parts were welded together by the multiple electrode gas shielded arc welding process, and it has been found that such non-uniformity in the properties of the respective weld layers was caused by the fact that the chemical composition of the weld metal made by one pass differed from that of the weld metal made by another pass and this was a phenomenon caused by two reasons, namely, one was the dilution of the weld metal with the base metal and the other was the promotion of the deoxidation reactions by the effect of preheating. As regards the problem of dilution, if, for example, two steel plates are placed edge to edge to form a single V groove with broad root face and welded together with two passes, because of a difference in the depth and width of the groove beween the first and second passes, the area of the groove face that would be melted by the first pass would be greater than in the case of the second pass with a resultant difference in the degree of dilution of the weld metal with the base metal between the two passes, namely, the rate of dilution of the weld bead layer made by the first pass would be greater than that of the weld bead layer made by the second pass. Consequently, even if the same welding electrode material were used for both the first and second passes, the chemical composition of the respective layers in the resulting weld metal differs from one another according to their positions in the direction of the groove depth. On the other hand, the base metal and the welding material contain alloying elements such as C, Mn, Si, Cr, Al, Ti, Zr, B, etc., which are easily combined with oxygen and the contents of these elements are high in high quality steels such as high tension steels and low temperature steels. As a result, during the welding such alloying elements combine with oxygen in the air around the arc and the shielding gas thus causing such deoxidation reactions as $C + 2O \rightarrow CO_2\uparrow$, $Mn + 2O \rightarrow MnO_2$, $Si + 2O \rightarrow SiO_2$, $2Cr + 3O \rightarrow Cr_2O_3$, $2Al + 3O \rightarrow Al_2O_3$, $Ti + 2O \rightarrow TiO_2$ and $2B + 3O \rightarrow B_2O_3$, so that these elements float to the surface of the bead as the deoxidation products (slag) or gases or these elements remain in the weld metal as the inclusions. Where, in view of the above-mentioned difference in the rate of dilution, these elements which take part in such reactions are present in different amounts in the weld bead layers made by the respective passes, the relative relation between the amount of the elements lost as the slag, gases or inclusions due to the reactions and the rest of the elements which remains in the weld metal as the solid solution elements or forms carbides and nitrides to constitute such parts which controls the properties of the weld metal is not the same throughout the respective layers formed by the multi-layer welding process. More strictly, the weld metals of the superposed bead layers consist of the alloys of different compositions and therefore it is impossible to expect the homogeneous properties throughout the weld metal. And this problem becomes increasingly difficult in the case of higher quality base metals.

The problem of promoted deoxidation reaction by the effect of preheating is as follows. That is, while the above-mentioned deoxidation reaction takes place when the globule from the forward end of the electrode wire melted by the arc passes through the arc, before the globule solidifies in the molten pool and partly after the solidification, the deoxidation reaction of the weld metal tends to be promoted considerably since the cooling rate of the weld metal is slowed down as the welding input heat is increased and higher the preheating and interlayer temperatures become thus maintaining the weld metal at an elevated temperature for a longer period of time. This means that in the continuous multi-layer welding, an increased amount of deoxidation reaction takes place during the welding by the following pass which is preheated by the heat energy caused by the leading electrode and consequently the weld metal made by the following pass loses an increased amount of the alloying elements.

Where the base metal contains considerable amounts of alloying elements and the multi-layer welding is accomplished by the multiple electrode automatic arc welding process, due to the combined action of the above-mentioned two effects, namely, the preheating effect and the effect due to the difference of dilution rate, there results a still wider variation in the chemical composition of the weld metal of the bead layers deposited by the respective passes and this in turn results in a wider variation in the properties of the weld metal at different positions.

Figure 1:
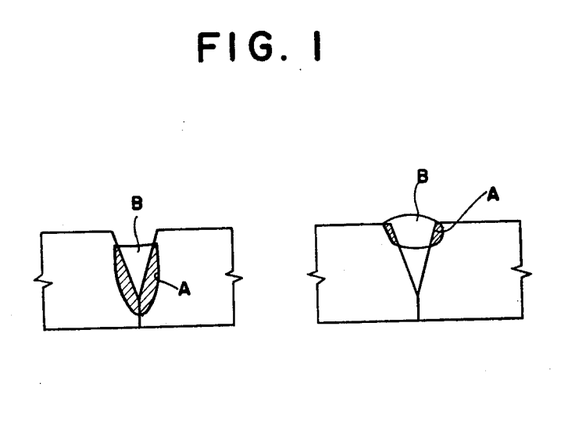
FIGS. 1(a) and 1(b) are schematic diagrams showing respectively the manner in which the weld metal deposited by each pass is diluted with the base metal.

In the multiple electrode gas shielded welding, the dilution rate showing the extent in which a certain alloying element of the welding electrode wire in the weld metal is diluted by the base metal, differs depending on the position of the bead layers in the case of a multi-layer welding and the dilution rate of the second and subsequent layers becomes increasingly smaller as compared with that of the first layer, namely, the alloy content becomes closer to that in the weld metal made by the electrode wire alone. This fact may be explained in a brief way with reference to FIGS. 1(a) and 1(b) showing by way of example the case of welding two steel plates by depositing the weld metal with two passes. Referring to FIG. 1(a) showing the weld metal made by the first pass, assuming that A represents the cross-sectional area of the base metal portion in the weld zone by the first pass and B represents the cross-sectional area of the deposited metal portion in the weld zone by the first pass, the resulting dilution rate P is given as follows $$P = \frac{A}{A + B}$$

On the other hand, with the second pass weld metal shown in FIG. 1(b), assuming that A' represents the cross-sectional area of the base metal portion in the weld zone by the second pass and B' represents the cross-sectional area of the deposited metal portion in the weld zone by the second pass, the resulting dilution rate P is given as follows $$P' = \frac{A'}{A' + B'}$$

Thus, if the deposition efficiency is the same for both the first and second passes, then there results a relation P > P' since the depth and width of the groove are not the same for the two passes as mentioned earlier.

Figure 2:
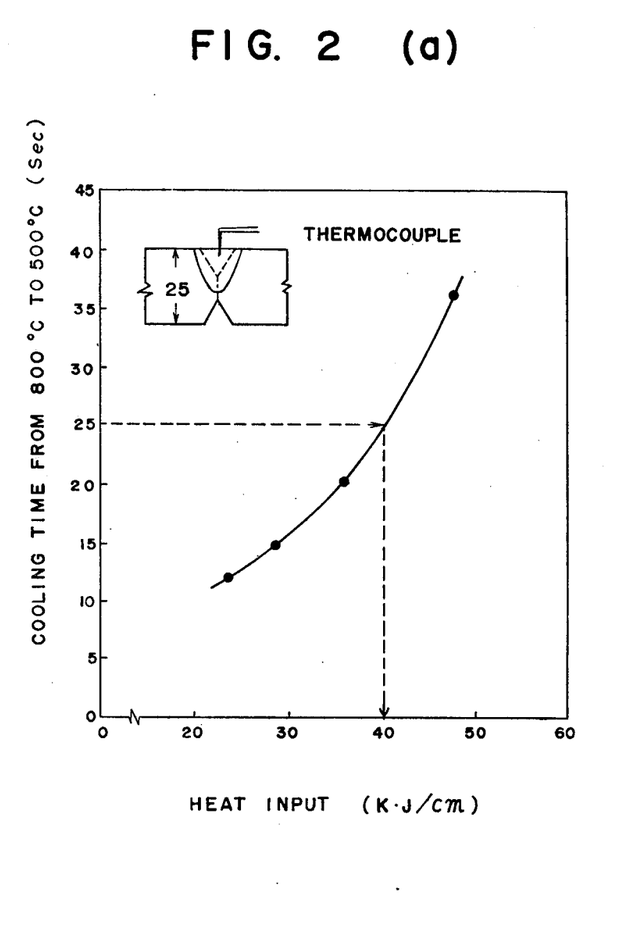
FIGS. 2(a) and 2(b) are graphs showing the results of the tests conducted for the purpose of calculating the cooling speeds and the equivalent input heats in the multiple electrode gas shielded arc welding process.

FIG. 2 shows an example of the test results for calculating the equivalent welding heat inputs for the second or subsequent pass when welding a steel plate of 25 mm thick by the two-electrode tandem sequence gas shielded arc welding process from both sides of the plate, one run for each welding electrode. In this example, the preceeding pass was made under the conditions of welding current = 800A, welding voltage = 30V and welding speed = 300mm/min and the welding input heat was 24 K.J/cm, while the following pass was applied under the conditions of welding current = 700A, welding voltage =30V and welding speed = 600mm/min and the welding heat input was 21 K.J/cm. The welding was effected by changing the distance between the leading and trailing electrodes to vary the interpass temperature between the leading and trailing electrodes. With the distance between the electrodes selected 350mm, the measurement made by inserting a thermocouple in the weld metal of the following bead indicated that the time required for cooling from 800° C down to 500° C was on the order of 25 seconds as shown in FIG. 2 (b) and this is equivalent to the welding heat input of 40K.J/cm when compared with the cooling time in the case of the single electrode welding as shown in FIG. 2(a). Thus, it is clear that, while the welding input heat actually applied to the following pass was 21 K.J/cm, the substantial equivalent heat input was 40 K.J/cm which is practically two times the value of the actual heat input. This only mean that the preceeding pass has a considerable preheating effect and it is also understandable from this fact that a full consideration must be given to the previously mentioned deoxidation reactions and the resulting non-uniformity in the properties of the weld metal of the weld bead layers made by the respective passes.

The method of gas shielded arc welding according to the invention may be applied to any of processes employing electrodes consisting of wires having a large diameter or wires of a small diameter, provided the method employs a plurality of electrodes. Also the number of electrodes is not limited to two. Further, the types of shielding gas used with the present invention are not limited and various shielding gases may be used, such as, a mixed gas consisting of argon mixed with oxygen or a mixed gas consisting of argon mixed with carbon deoxide gas. Helium may also be used as the shielding gas in place of argon. In accordance with the present invention, the chemical composition of the shielding gas used for the leading electrode or electrode group is selected to differ from that of the shielding gas for the trailing electrode or electrode group to vary particularly the volume ratio of the active gas contained in the shielding gas and in this way the required multi-layer welding is accomplished. Which of the shielding gases for the leading and trailing electrodes or electrode groups has a higher active gas volume ratio than the other is suitably determined by the fact that which of the base metal and the welding material contains greater amounts of those elements which are easily combined with oxygen, namely, depending on whether the welding material is a low alloy material of high alloy material in relation to the base metal.

For instance, in the case of the mutiple electrode gas shielded arc welding involving the use of a welding material containing the equivalent or smaller amounts of alloying elements, the volume ratio of the active gas in the shielding gas for the leading electrode or electrode group is selected high and that of the active gas in the shielding gas for the trailing electrode or electrode group is made low. In this way, the amount of oxygen fed to each of the preceeding and following passes is accurately controlled so that the deoxidation reaction is promoted in the preceeding pass having a higher rate of dilution than the following pass, while the deoxidation reaction is checked in the following pass which is preheated by the heat energy provided by the leading electrode, and in this way the composition of the weld metal made by the preceeding pass may be brought close to that of the weld metal made by the following pass.

On the other hand, in the case of the multiple electrode gas shield arc welding involving a welding material containing greater amounts of alloying elements than the base metal, the amount of oxygen fed is controlled by making low the volume ratio of the active gas in the shielding gas for the leading electrode or electrode group and making high the volume ratio of the active gas in the shielding gas for the training electrode or electrode group, and in this way the weld metals made by the respective passes may be made of the compositions similar to one another.

As regards the above-mentioned variation in the shielding gas composition, namely, the definite volume ratios of the active gas in the shielding gas, they may be suitably selected in accordance with the electrode wire diameter, the composition of the base metal and the weld metal, etc. Anyway, by adjusting the composition of the shielding gas for the leading and trailing electrodes, respectively, the control of deoxidation reaction that suits the amounts of deoxidizing elements can be easily accomplished and in this way the weld metal can be accurately homogenized.

Figure 3:
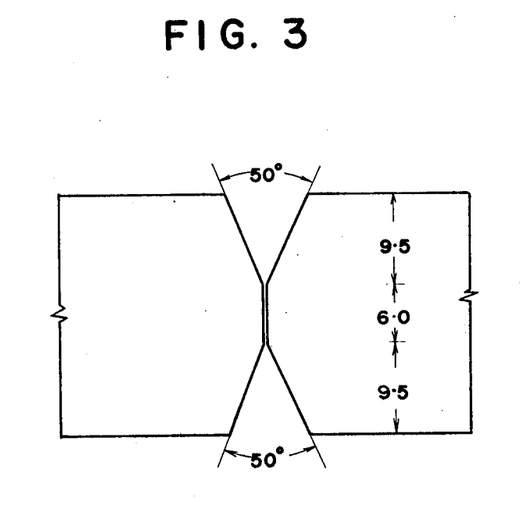
FIG. 3 is a schematic diagram showing an exemplary form of the groove shape used in working the present invention.
Figure 4:
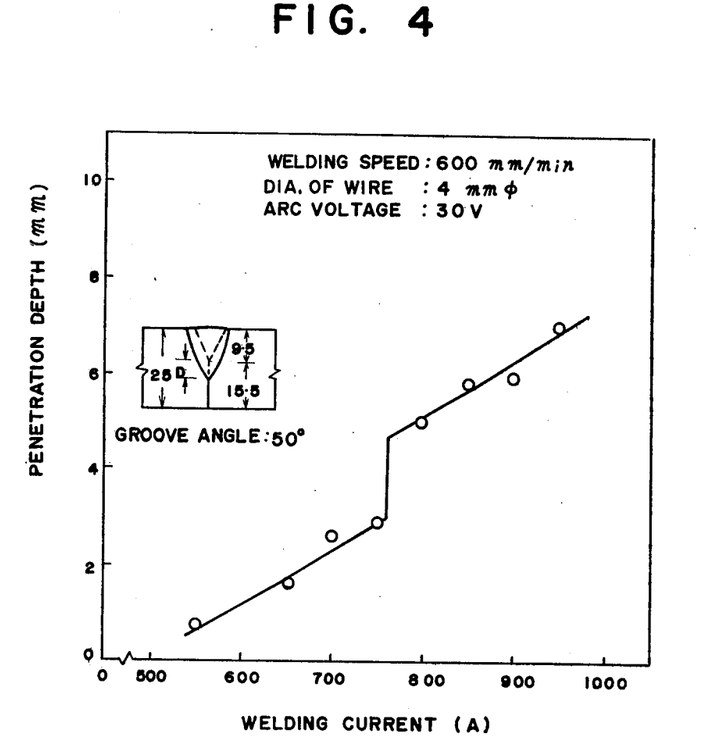
FIG. 4 is a graph showing the correlation between the welding current and the depth of penetration by a single welding electrode.
Figure 5:
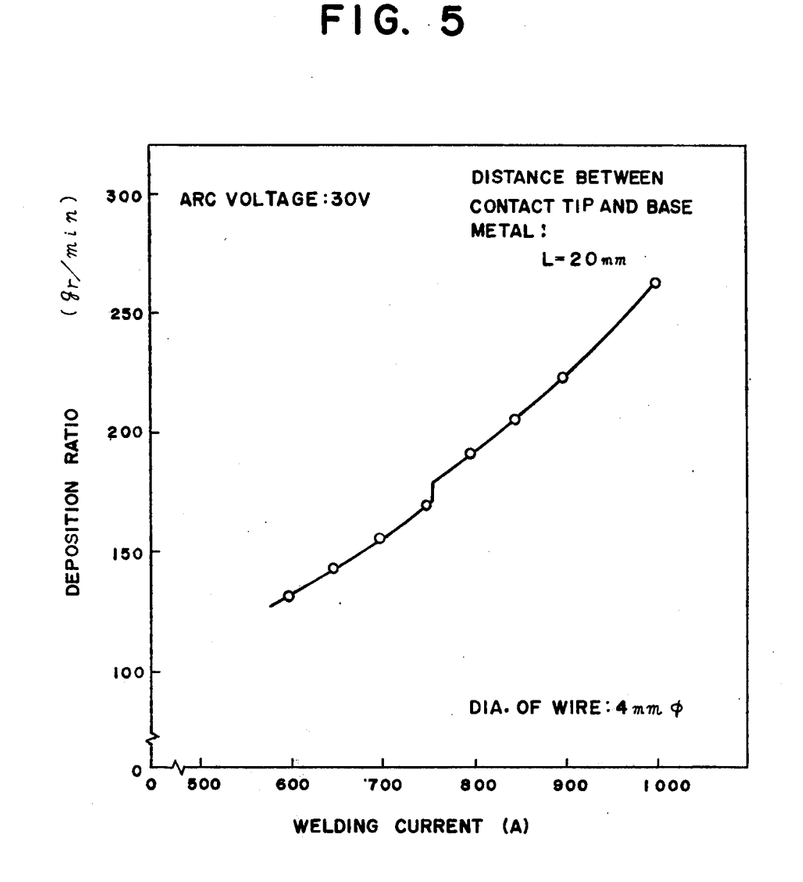
FIG. 5 is a graph also showing the correlation between the welding current and the amount of deposition of the electrode wire.

In accordance with the present invention, the multi-layer welding is also accomplished by adjusting the composition of the shielding gas for the preceeding pass relative to that of the shielding gas for the following pass to considerably improve the welding properties and thereby to produce high quality welded joint metals. In other words, FIG. 3 shows the groove shape employed in the manufacture of steel tubes (wall thickness is 25 mm) by the method of multiple electrode tandem sequence gas shielded arc welding according to a preferred embodiment of the invention in which a single run each of the respective electrodes is applied on each side of the material, FIG. 4 shows the relationship between the welding current and the penetration depth in the single electrode gas shielded welding and FIG. 5 shows the relationship between the welding current and the amount of deposited electrode wire in the single electrode gas shielded welding. In this case, in order that the weld beads deposited on the inner and outer surfaces of the tube may be properly bonded at the center of the thickness of the plate, it is essential that the depth of weld penetration is more than 4.5 to 5.0 mm at the least and thus it will be seen from FIG. 4 that the welding current value for the leading electrode must be 800 amperes in the tandem sequence gas shielded welding.

On the other hand, if the welding current value is selected 800 amperes, then the amount of deposited electrode wire is on the order of 195 gr/min. Therefore, if the welding speed is selected 600 mm/min, then the groove of the shape shown in FIG. 3 will be filled with the weld metal from the electrode wire up to a level which is about 0.5 mm below the surface. Consequently, to fill the remaining slight space in the groove and obtain the proper reinforcement weld height (usual height is over 3.0 mm) and the proper weld bead width (usual width is 20 to 22 mm), it is essential to deposit a weld metal of about 150 to 160 gr/min by the following pass and use the same welding speed of 600 mm/min as the preceeding pass. In view of these welding conditions, the proper welding current value for the following pass should be 700 amperes as will be apparent from FIG. 5. It is a well known fact that in the gas shielded arc welding it is generally desirable to effect the welding in the spray arc region, and if the welding is accomplished in the globule arc region or the short-circuiting region, it is impossible to obtain the proper penetration depth and moreover a considerable amount of spatter is caused thus deteriorating the welding properties considerably.

Figure 6:
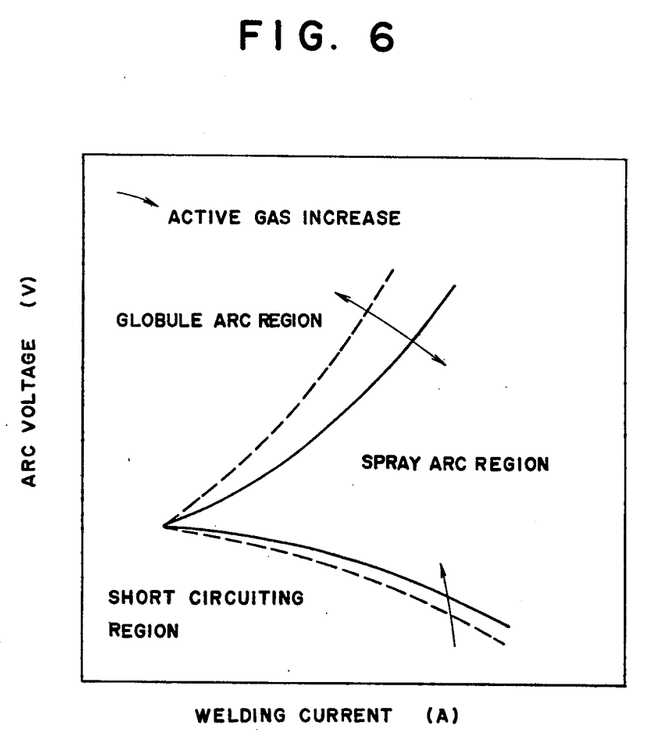
FIG. 6 is a graph showing the effect of the composition of the shielding gas upon the arcing phenomenon which is determined by the arc voltage and the arc current.
Figure 7:
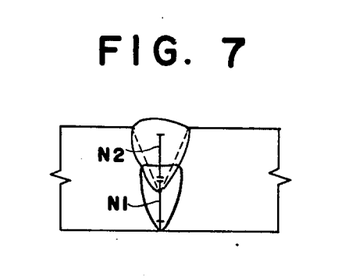
FIG. 7 is a schematic diagram showing the location of the notch formed in the Charpy test pieces used in the examples of the invention.

The inventors, etc. have discovered through various experiments and studies that if the arc voltage is suitably maintained constant in the gas shielded arc welding, the range of welding current which produces a spray arc varies considerably depending on the volume ratio of the active gas in a shielding gas. In other words, FIG. 6 is a graphic representation showing the manner in which the arcing phenomenon which is dependent on the arc voltage and welding current is varied depending on the volume ratio of the active gas in a shielding gas, and this will be explained in greater detail by taking the case of the above-mentioned embodiment. When the welding current of 800 amperes is supplied to the leading electrode, the amount of active gas required for producing a spray arc condition is 15% if carbon deoxide gas ($CO_2$) is introduced into argon, while 5% of $CO_2$ may be properly introduced into argon to provide the similar spray arc condition by supplying the welding current of 700 amperes to the trailing electrode. In other words, if the preceeding pass is effected by using as the shielding gas a mixture of argon with 15% of $CO_2$ and the following pass is effected by using as the shielding gas a mixture of argon with 5% $CO_2$, it is possible to prevent the occurrence of spatter. However, it has been found that if a mixture of argon with 15% of $CO_2$ is used as the shielding gas for both the preceeding and following passes and the welding is accomplished with the same welding conditions mentioned above, the tip of the electrode wire will be short-circuited by the weld metal of the molten pool thus causing a considerable amount of spatter and hence deteriorating the welding properties considerably.

As will be seen from the foregoing, it has been found that in the above-mentioned example, it is important to control and vary the composition of the shielding gas for each of the leading and trailing electrodes relative to each other and in this way it is possible to produce a sound weld zone without any spatter and weld defects but with improved welding properties.

The following examples describe in greater detail the welding of steel plates in accordance with the present invention.

EXAMPLE 1

Using two different types of titanium base wire as the electrode wires and 3.5% nickel steel plate of 20 mm thick as the base metal, the multiple electrode automatic gas shielded welding of the plate was accomplished with two passes with the following welding conditions:

| (1) | Electrode wire diameter | : 4 mmΦ for both leading and trailing electrode wires |
|---|---|---|
| (2) | Welding current, voltage and speed | : preceeding pass, 800A × 30V × 600 mm/min following pass, 760A × 31V × 600 mm/min |
| (3) | Shielding gas | : mixed gas of Ar + $CO_2$ |

The following Table 1 shows the test results on the properties of the product obtained by using the same volume ratio of carbon deoxide gas in the shielding gas for both the leading and trailing electrodes (the conventional method) and the product obtained by varying the volume ratio of carbon deoxide gas (the method of this invention).

Table 1

| | | Conventional method | Method of the invention |
|---|---|---|---|
| Volume ratio (%) of $CO_2$ in shielding gas | | Leading electrode, 20 Trailing electrode, 20 | Leading electrode, 20 Trailing electrode, 10 |
| VE-80° C (Kg.m) | N1 | 12.0 | 12.8 |
| | N2 | 4.0 | 13.2 |

(Notes):
The $CO_2$ volume ratio is $\frac{CO_2}{Ar + CO_2}$.

The Charpy tests were made using the standard Charpy test specimens of 2 mm V-notch. N1 represents the case wherein the notch was formed in the weld metal largely made by the first pass and N2 represents the case wherein the notch was formed in the weld metal largely made by the second pass.

As will be seen from Table 1, according to the method of this invention the accurately homogenized weld metal was obtained by increasing the volume ratio of the active gas in the shielding gas for the leading electrode and decreasing the volume ratio of the active gas in the shielding gas for the trailing electrode.

Figure 8:
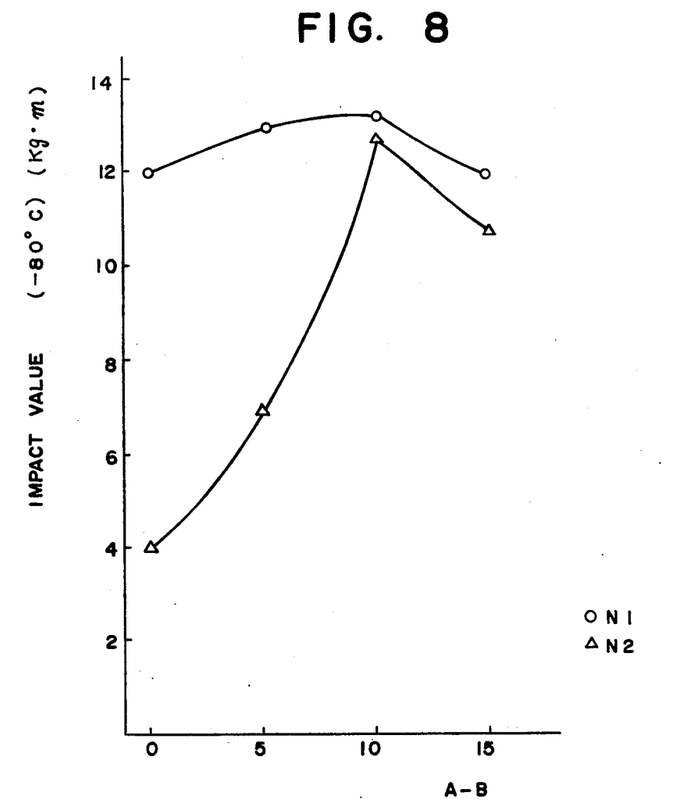
FIG. 8 is a graph showing an exemplary form of the transition tendency of the Charpy impact value when the volume ratio of the active gas in the shielding gas for the leading electrode is fixed and the volume ratio of the active gas in the shielding gas for the trailing electrode is varied.

When, in this example, the $CO_2$ volume ratio (A) of the shielding gas for the leading electrode was fixed at 20%, the $CO_2$ volume ratio (B) of the shielding gas for the trailing electrode was decreased gradually, the difference (A − B) was represented on the abscissa and the Charpy test value was represented on the ordinates the resulting tendency curves for N1 and N2 were as shown in FIG. 8, and it will be seen that the variation in the volume ratio of $CO_2$ in the shielding gas for the leading and trailing electrodes has a considerable effect on the Charpy test value.

EXAMPLE 2

Using Ti-B-Al-Zr base high alloy composition wires as the electrode wires and steel plate containing 1.6% Mn and 0.5% Ni and having a thickness of 20 mm as the base metal, the multiple electrode automatic gas shielded arc welding of the plate was accomplished using the same welding conditions as stated in (1), (2) and (3) of the first Example and increasing the $CO_2$ volume ratio of the shielding gas for the trailing electrode over that of the shielding gas for the leading electrode. The following Table 2 shows the similar test results as the first Example.

Table 2

| | | Conventional method | Method of the invention |
|---|---|---|---|
| Volume ratio (%) of $CO_2$ in shielding gas | | Leading electrode, 10 Trailing electrode, 10 | Leading electrode, 10 Trailing electrode, 20 |
| VE-50° C (Kg.m) | N1 | 8.6 | 8.8 |
| | N2 | 2.8 | 8.2 |

As will be seen from the above Table 2, where the welding material is a high alloy material relative to the base metal, the $CO_2$ volume ratio of the shielding gas for the trailing electrode may be increased in relation to that of the shielding gas for the leading electrode to bring the chemical compositions of the weld metals made by the respective passes close to each other and thereby to ensure the homogeneous properties throughout the entire weld metal.

EXAMPLE 3

Using the electrode wires and base metal of the same characters as the Example 1, the same welding conditions as the Example 1 regarding the wire diameter and welding current, voltage and speed and a mixed gas of $Ar + O_2$ as the shielding gas, the multiple electrode automatic gas shielded welding of the plate was accomplished. The following Table 3 shows the similar test results as the Example 1.

Table 3

| Volume ratio (%) of $O_2$ in shielding gas | | Conventional method Leading electrode, 10 Trailing electrode, 10 | Method of the invention Leading electrode, 10 Trailing electrode, 20 |
|---|---|---|---|
| VE-80° C (Kg.m) | N1 | 11.5 | 11.3 |
|  | N2 | 2.4 | 11.8 |

It will be seen from the above Table 3 that the method of this invention is also effective in homogenizing the properties of the respective layers in the weld metal even when a mixture of $Ar + O_2$ is used as the shielding gas.

EXAMPLE 4

Figure 9:
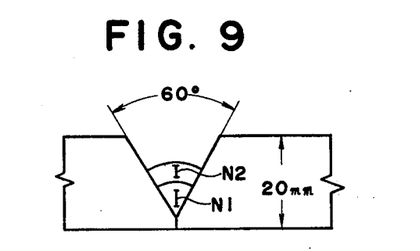
FIG. 9 is an explanatory diagram showing the locations of the notch formed in the Charpy test specimens used in another example of the present invention.

Using 10.5% Ni, Ti base wires of 1.6 mmφ diameter as the electrode wires, 9% Ni steel plates of 20 mm thick as the base metal and the groove angle shown in FIG. 9, the one-side multi-layer automatic gas shielded arc welding of the plate was accomplished. The welding conditions were as follows: the leading electrode, 380A × 28V × 250 mm/min; the trailing electrode, 320A × 32V × 250 mm/min; and the shielding gas, $Ar + CO_2$. The following Table 4 shows the similar test results as the Example 1.

Table 4

| Volume ratio (%) of $CO_2$ in shielding gas | | Conventional method Leading electrode, 3 Trailing electrode, 3 | Method of the invention Leading electrode, 3 Trailing electrode, 1 |
|---|---|---|---|
| VE-196° C (Kg.m) | N1 | 5.6 | 5.4 |
|  | N2 | 0.8 | 5.0 |

(Note):
The size of test specimens is the 2 mm V-notch sub-size.

As will be seen from the above Table 4, the method of this invention is also highly effective when it is applied to the one-side welding involving the use of small diameter electrode wires.

EXAMPLE 5

Using the same welding conditions as the Example 4 except that a mixture of $Ar + O_2$ was used as the shielding gas, the one-side multi-layer automatic arc welding of the material was accomplished. The following Table 5 shows the similar test results as the Example 1.

Table 5

| Volume ratio (%) of $O_2$ in shiel | | Conventional method Leading electrode, 0 Trailing electrode, 1 | Method of the invention Leading electrode, 1 Trailing electrode, 0 |
|---|---|---|---|
| VE-196° C (Kg.m) | N1 | 5.5 | 5.6 |
|  | N2 | 0.6 | 5.1 |

It will be seen from the above Table 5 that the method of this invention is capable of performing with excellent results the one-side multi-layer welding using small diameter electrode wires and either of the mixture gases, and moreover the control of the shielding gas composition for the leading and trailing electrodes provided according to the method of the present invention includes the cases where the active gas is reduced to zero.

EXAMPLE 6

Using the same welding conditions and shielding gas as the Example 1, the automatic gas shielded welding was accomplished with the following electrode wires and base metal:

| Electrode wires | : | (1) | Titanium base material (hereinafter referred to as a wire A) | | |
|---|---|---|---|---|---|
|  |  | (2) | Material containing : C, 0.10% ; | | |
|  |  |  | Si, 0.35 % ; Mn, | 2.00 % ; S, | 0.015 % ; |
|  |  |  | P, 0.015 % ; Ni, | 2.00 % ; Mo, | 0.30 % ; |
|  |  |  | Ti, 0.25 % ; B, | 0.010 % ; Al, | 0.02 % |
|  |  |  | (hereinafter referred to as a wire B) | | |
|  |  |  | The diameter of the both wires was 4 mmΦ. | | |
| Base metal | : |  | C, 0.08 % ; Si, | 0.30 % ; Mn, | 1.40 % ; |
|  |  |  | Mo, 0.30 % ; Cr, | 0.50 % ; Ni, | 3.88 % ; |
|  |  |  | P, 0.010 % ; S, | 0.010 % ; |  |
|  |  |  | Ti, 0.03 % ; Al, | 0.04 % ; |  |
|  |  |  | The plate thickness was 20 mm. | | |

The following Table 6 shows the similar test results as the Example 1.

Table 6

| $CO_2$ volume ratio of shielding gas and type of wire | | Conventional method Leading electrode, 20 % A Trailing electrode, 20 % A | Method of the invention Leading electrode, 20 % A Trailing electrode, 10 % B |
|---|---|---|---|
| VE-80° C (Kg.m) | N1 | 12.0 | 12.6 |
|  | N2 | 4.0 | 15.3 |

As will be seen from the above Table 6, the method of this invention is capable of producing excellent products when the shielding gases having different compositions are used for the leading and trailing electrodes and the wires having different chemical compositions are used as the leading and trailing electrodes.

It will thus be seen from the foregoing that in accordance with the present invention, the multiple electrode gas shielded arc welding is accomplished by controlling the composition of the shielding gas for the leading or trailing electrode or electrode group relative to that of the shielding gas for the other and in this way the chemical composition of the weld metal made by each pass is accurately controlled to properly homogenize the properties of the respective layers in the entire weld metal and solve the problem of the occurrence of spatter, thereby ensuring an improved welding efficiency and operating properties and producing weld zones of excellent properties.

What is claimed is:

1. A method of multiple electrode gas shielded arc welding comprising the steps of: mixing gases of at least one inert gas and at least one active gas as shielding gas, and selecting the active gas content of shielding gas fed to leading electrode means so as to differ from the active gas content of shielding gas fed to trailing electrode means.

2. A method as set forth in claim 1, wherein each of the electrodes is an electrode wire having a chemical composition equivalent to or containing lower amounts of alloying elements than a base metal, and the volume ratio of the active gas in the shielding gas for the leading electrode or electrode group is selected higher than that of the active gas in the shielding gas for the trailing electrode or electrode group.

3. A method as set forth in claim 1, wherein each of the electrodes is an electrode wire having a high alloy chemical composition relative to a base metal, and the volume ratio of the active gas in the shielding gas for the leading electrode or electrode group is selected lower than that of the active gas in the shielding gas for the trailing electrode or electrode group.

4. The method according to claim 1, wherein the active gas content of the shielding gas is selected on the basis of the relationship between the compositions of the base metal and the welding material.

5. The method according to claim 1, wherein the active gas content of the shielding gas is selected on the basis of the relationship between the value of current applied to the said leading and trailing electrode means and the stable region of spray arc.

6. The method according to claim 1, wherein the active gas content of the shielding gas is selected on the basis of the relationship between a thermal cycle given by said leading and trailing electrode means and the reactivity of gas components at elevated temperatures.

7. A method as set forth in claim 1, wherein each of said electrode means comprises an electrode wire having a chemical composition with substantially lower amounts of alloying elements than a base metal, the volume ration of the active gas in the shielding gas for the leading electrode means being higher than that of the active gas in the shielding gas for the trailing electrode means.

8. A method as set forth in claim 1, wherein each of said electrode means comprises an electrode wire having a high alloy chemical composition relative to a base metal, the volume ratio of the active gas in the shielding gas for the leading electrode means being lower than that of the active gas in the shielding gas for the trailing electrode means.

9. A method as defined in claim 1, wherein the active gas content of the shielding gas is selected on the basis of the relationship between the compositions of the base metal and the welding material and on the basis of the relationship between the value of current applied to said leading and trailing electrode means and the stable region of spray arc, the active gas content of the shielding gas being also dependent on the relationship between a thermal cycle given by said leading and trailing electrode means and the reactivity of gas components at elevated temperatures, each of said electrode means comprising an electrode wire having a chemical composition with substantially lower amounts of alloying elements than a base metal, the volume ratio of the active gas in the shielding gas for the leading electrode means being higher than that of the active gas in the shielding gas for the trailing electrode means.

* * * * *